United States Patent
Barton et al.

(10) Patent No.: US 7,434,139 B2
(45) Date of Patent: Oct. 7, 2008

(54) REMOTE MODULE FOR A COMMUNICATIONS NETWORK

(75) Inventors: Bruce R. Barton, Los Gatos, CA (US); Paul R. Hartmann, Dallas, TX (US); Maynard A. Wright, Citrus Heights, CA (US)

(73) Assignee: Acterna, LLC, Germantown, MD (US)

( * ) Notice: Subject to any disclaimer, the term of this patent is extended or adjusted under 35 U.S.C. 154(b) by 721 days.

(21) Appl. No.: 11/140,359

(22) Filed: May 26, 2005

(65) Prior Publication Data

US 2005/0220031 A1    Oct. 6, 2005

Related U.S. Application Data

(62) Division of application No. 10/223,232, filed on Aug. 15, 2002, now Pat. No. 6,910,167.

(60) Provisional application No. 60/312,735, filed on Aug. 15, 2001.

(51) Int. Cl.
    *H03M 13/00*    (2006.01)
(52) U.S. Cl. ...................... 714/756; 714/782
(58) Field of Classification Search .................. None
    See application file for complete search history.

(56) References Cited

U.S. PATENT DOCUMENTS

| | | | |
|---|---|---|---|
| 4,541,091 A | 9/1985 | Nishida et al. | |
| 4,924,459 A | 5/1990 | Angell et al. | |
| 5,063,551 A * | 11/1991 | Yoshio et al. | ............ 369/47.21 |
| 5,235,332 A | 8/1993 | Stephenson, Jr. | |
| 5,495,470 A | 2/1996 | Tyburski et al. | |
| 5,500,853 A | 3/1996 | Engdahl et al. | |
| 5,566,161 A | 10/1996 | Hartmann et al. | ............. 370/15 |
| 5,757,776 A | 5/1998 | Ellebracht et al. | |
| 5,774,456 A | 6/1998 | Ellebracht et al. | |
| 5,790,531 A | 8/1998 | Ellebracht et al. | ............ 370/242 |
| 5,946,300 A | 8/1999 | Wilbrod | |
| 5,966,657 A | 10/1999 | Sporre | |
| 6,091,712 A | 7/2000 | Pope et al. | |
| 6,275,472 B1 | 8/2001 | Yamaguchi et al. | |
| 6,539,512 B1 * | 3/2003 | Jeong et al. | .................. 714/752 |

(Continued)

OTHER PUBLICATIONS

"Definitions of Managed Objects for the DS#/E3 Interface Type" by Fowler et al. IETF Standard, Internet Engineering Task Force, IETF, CH, Jan. 1999.

(Continued)

*Primary Examiner*—Christine T Tu
(74) *Attorney, Agent, or Firm*—Allen, Dyer, Doppelt, Milbrath & Gilchrist, P.A.

(57) ABSTRACT

Determination of the location of an error condition or a failure includes receiving at a network interface a first framed digital signal from customer premises equipment, and determining whether the first framed digital signal indicates a failure. Overhead bits are modified in the first framed digital signal to generate a second framed digital signal, such that the modification is equivalent to insertion of errors into the first framed digital signal at a bit error ratio (BER) of not greater than a predetermined ratio, if the first framed digital signal indicates a failure. The second framed digital signal is then sent from the network interface in place of the first framed digital signal to indicate that the failure reported by the first framed digital signal is located in the customer premises equipment. Otherwise, if no failure is indicated, the first framed digital signal is transmitted without any modifications.

6 Claims, 7 Drawing Sheets

U.S. PATENT DOCUMENTS 6,910,167 B2 * 6/2005 Barton et al. .............. 714/746
2001/0046232 A1 11/2001 Takagi et al.

OTHER PUBLICATIONS

"Transmission and Multiplexing (TM); Generic requirements of transport functionality of equipment; Part 2-I: Synchronous digital Hierarchy (SDH) and Plesiochronous Digital Hierarchy (PDH) physical section layer functions"; Final draft ETSI EN 300 417-2-1, ETSI Standards, European Telecommunications Standards Institute, Sophia-Antipo, FR, vol. TM-1, No. V121, Jun. 2001.

* cited by examiner

REMOTE MODULE FOR A COMMUNICATIONS NETWORK

CROSS REFERENCE TO RELATED APPLICATIONS

This application is a divisional application of U.S. application Ser. No. 10/223,232 filed Aug. 15, 2002 now U.S. Pat. No. 6,910,167 entitled "Remote Module for a Communications Network", by Bruce R. Barton et al., which claims priority to U.S. Provisional Application Ser. No. 60/312,735 filed Aug. 15, 2001 entitled "Remote Module for a Communications Network", by Bruce R. Barton et al., both of which are incorporated by reference in their entirety herein.

BACKGROUND

This invention relates generally to telecommunication systems, and more particularly to determination of the points of origin of error conditions and failures in a telecommunication system.

A digital telecommunication system that connects users in disparate locations can be logically divided into various regions of equipment. Each equipment region carries with it an accompanying responsibility for maintenance and repair of that equipment. A telecommunication system typically includes at least one customer premises equipment (CPE) region, which includes telecommunication equipment that is generally maintained by a customer such as a business establishment. A second region typically includes equipment that is maintained by a local exchange carrier (LEC) and a third region typically includes equipment that is maintained by an inter-exchange carrier (IEC). The LEC equipment and IEC equipment can be collectively referred to as the network equipment.

A CPE region can include a variety of telecommunications equipment, such as telephones, facsimile machines, computers, and modems carrying a variety of data signals. The CPE region is typically linked to the LEC, which provides communication services to a plurality of CPE regions. The LEC is commonly referred to or viewed as the "local telephone company" of the CPE business. Several LECs are then communicatively linked by one or more IECs, for example, IECs such as "AT&T", "MCI/Worldcom", and "Sprint." These carriers are often referred to as "long distance" carriers. It is generally the responsibility of each entity or region to maintain its own equipment. For example, the customer has the responsibility of maintaining its communication equipment and ensuring that its equipment transmits a proper signal. Likewise, the LEC has the responsibility of maintaining equipment that is outside the boundary of the customer but not at the level of the long distance carrier (IEC).

The customer and local exchange carriers use maintenance equipment, such as a DS1 Interface Connector or network interface unit (NIU) (hereafter referred to as "network interface unit" or NIU) and a channel service unit (CSU), that assist in performing test and maintenance functions for the respective telecommunication equipment and connecting lines. The maintenance equipment generates maintenance signals that have an alarm state that indicates whether an error condition or a failure is present on an incoming or outgoing signal.

In accordance with standards such as the Standard T1.403-1999, one type of maintenance signal alarm indication is the Remote Alarm Indicator (RAI), which is an indication provided to a source device indicating a signal failure condition at a device that is configured to receive the signal. An NIU or CSU transmits the RAI signal in the outgoing direction when an incoming signal is lost. Another type of alarm indication, under Standard T1.403-1999, is the Alarm Indication Signal (AIS), which is a signal transmitted in place of a "normal" data signal to maintain transmission continuity and to indicate to a receiving terminal that there is a transmission fault located either at or upstream (i.e., relative to the flow of data) from the equipment originating the AIS signal. According to the Standard T1.403-1999, the AIS signal is generated as an unframed, all-ones signal.

There currently exist network interface units (NIUs) that are configured to receive and decode digital signals, such as the maintenance signals generated by the CSUs discussed above. In particular, signals called "DS1" are signals transmitted by an NIU at a nominal rate of 1.544 Mbits per second in accordance with the Standard T1.403-1999 referred to above. The NIUs are located at the point of demarcation between the CPE and the LEC equipment. The NIUs are used to determine the point of origin of alarm indication signals and thereby determine whether the customer, the LEC, or the IEC is responsible for attending to the condition that caused the alarm. The DS1 signal configuration includes a variant of AIS referred to as AIS-Customer Installation (AIS-CI), which is generated within the network and is transmitted toward the network, away from the customer installation, when either an AIS defect or an LOS defect has been detected in the signal received from the CI. RAI-CI signal is a variant of the RAI, which indicates that RAI has been detected in the signal from the CI and that the defect or failure that caused the origination of the RAI is not found in the signal from the network.

Other signal configurations have been proposed and are being used, such as the "DS3" signal specified by the Standard T1.107-2001. A DS3 signal comprises a "layering" or "multiplexing" of multiple DS1 signals and has frame structures, payload, header bits, and the like of a different configuration from the DS1 signals described above. Thus, according to the Standard T1.107-2001, all DS3 signals should be framed. Accordingly, a network interface unit that is transmitting DS3 signals cannot indicate the location of alarm events using the above-referenced DS1 maintenance signals scheme because the alarm indicators for these signals are unframed. This makes it difficult to trouble shoot problems in communications between the CPE, LEC, and IEC regions, increasing maintenance costs. That is, a network interface device that can recognize DS1 maintenance signals cannot necessarily recognize DS3 maintenance signals. For example, a network interface device that recognizes AIS-CI signals in the DS1 format will detect the AIS-CI pattern in the signal data comprising a repeating 16-bit pattern including eight zero-bits followed by eight one-bits. This type of processing will not detect corresponding DS3 signals. Furthermore, the form of the DS1 RAI-CI signal cannot be used for DS3 because the RAI signal for DS3 has a format different from that of DS1 RAI.

There is therefore a need in the art for configuring DS3 maintenance signals that can be recognized by the network interface device.

SUMMARY

The location of an error condition or a failure in a communications network is determined by receiving at a network interface a first framed digital signal from customer premises equipment, and determining whether the first framed digital signal indicates a failure. If a failure is indicated, overhead bits are configured in a second framed digital signal. The configured bits are not part of the conventional framed digital signal, such that the configuration is equivalent to the insertion of errors into the first framed digital signal at a bit error ratio (BER) of not greater than a predetermined ratio. The BER is expressed as a ratio of errored bits per unit time to total bits per unit time. The second framed digital signal is then sent from the network interface in place of the first framed digital signal and is interpreted by a suitably configured receiving device to indicate that the failure reported by the first framed digital signal is located in the customer premises equipment. Thus, a conventional receiving device would not detect the modified bits as an error. The second framed digital signal includes a signal that indicates the location of an error condition or a failure. Otherwise, if no failure is indicated in the first framed digital signal, the first framed digital signal is transmitted without any modifications.

In another aspect, the location of a remote alarm condition is determined by receiving at a network interface a first framed signal from a network, determining whether the first framed signal indicates a failure, receiving at the network interface a second framed signal from a customer premises equipment, and determining whether the second framed signal exhibits a remote alarm condition. If the first framed signal does not indicate a failure but the second framed signal exhibits a remote alarm condition, then overhead bits are modified in the second framed signal to generate a third framed signal. The modified bits of the third framed signal are not part of a conventional framed digital signal of the communications network, such that the modification is equivalent to the insertion of errors into the second framed signal at a bit error ratio (BER) of not greater than a predetermined ratio. The third framed signal, which indicates that a failure is located at customer premises, is then sent from the network interface in place of the second framed signal. The third framed digital signal will be referred to as a DS3 RAI-CI signal. Otherwise, if no failure is indicated, the second framed signal is passed through without any modifications.

In another aspect, a C-bit channel of a M23-formatted DS3 signal is reformatted to obtain additional bandwidth. The reformatting includes dividing the C-bit channel into at least first, second, and third portions. The first portion provides an error correcting code. The second portion provides for stuffing control information. The third portion is used for transmission of monitoring and maintenance information.

In a further aspect, a network interface apparatus includes a receiver, a processor, and a multiplexer. The receiver is configured to receive a first framed digital signal from customer premises equipment. The processor determines whether the first framed digital signal indicates a failure. If the first framed signal indicates a failure, then the processor will configure overhead bits in a second framed digital signal, such that the configuration is equivalent to insertion of errors into the first framed digital signal at a BER of not greater than a predetermined ratio. The multiplexer selectively transmits the first framed digital signal if no failure is indicated, or transmits the second framed digital signal to indicate that an error condition or a failure is located in the customer premises equipment.

In a further aspect, a network interface apparatus includes a first receiver, a second receiver, a processor, and a multiplexer. The first receiver is configured to receive a first framed digital signal from a network. The second receiver is configured to receive a second framed digital signal from customer premises equipment. If the first framed digital signal does not indicate a failure but the second framed digital signal exhibits a remote alarm condition, the processor modifies overhead bits in the second framed digital signal to generate a third framed digital signal, such that the modification is equivalent to insertion of errors into the first framed digital signal at a BER of not greater than a predetermined ratio. The multiplexer selectively transmits the third framed digital signal toward the network to indicate that a remote alarm condition is located at customer premises equipment if the first framed digital signal does not indicate a failure but the second framed digital signal exhibits a remote alarm condition, or otherwise transmits the second framed digital signal toward the network.

DETAILED DESCRIPTION

In recognition of the above-stated difficulties associated with conventional configuration of maintenance signals for a communications network, embodiments for designing and generating signals and corresponding devices for the network in a particular format called DS3 are described. The following exemplary embodiments disclose devices and methods for generating maintenance signals and assisting in determining the point of origin of an alarm condition in the telecommunication link (herein referred to as a telecommunications network) between the customer premise equipment (CPE) and the network. In particular, a network interface unit called a remote module (e.g. a DS3 Remote Module) examines incoming and outgoing DS3 signals relative to the customer premises equipment of the telecommunications network. The remote module detects conventional DS3 maintenance alarm signals that indicate an alarm state, such as Alarm Indication Signal (AIS) and Remote Alarm Indicator (RAI). In response, the DS3 Remote Module (DS3RM), in accordance with the present invention, generates a unique DS3 maintenance signal (herein referred to as AIS-CI or RAI-CI) that indicates the point of origin of an alarm signal. The suffix "CI", which stands for customer installation, is used herein to designate the unique signature DS3 maintenance signals in accordance with the present invention. These DS3 maintenance signals utilize overhead bits that can be detected by downstream equipment. The overhead bits are transmitted in such a manner that the unique signature DS3 maintenance signals are transparent to equipment that is not configured to detect the unique signature, so that such equipment is not disrupted. Consequently, for purposes of illustration and not for purposes of limitation, the exemplary embodiments of the invention are described in a manner consistent with such use, though the invention is not so limited.

Figure 1:
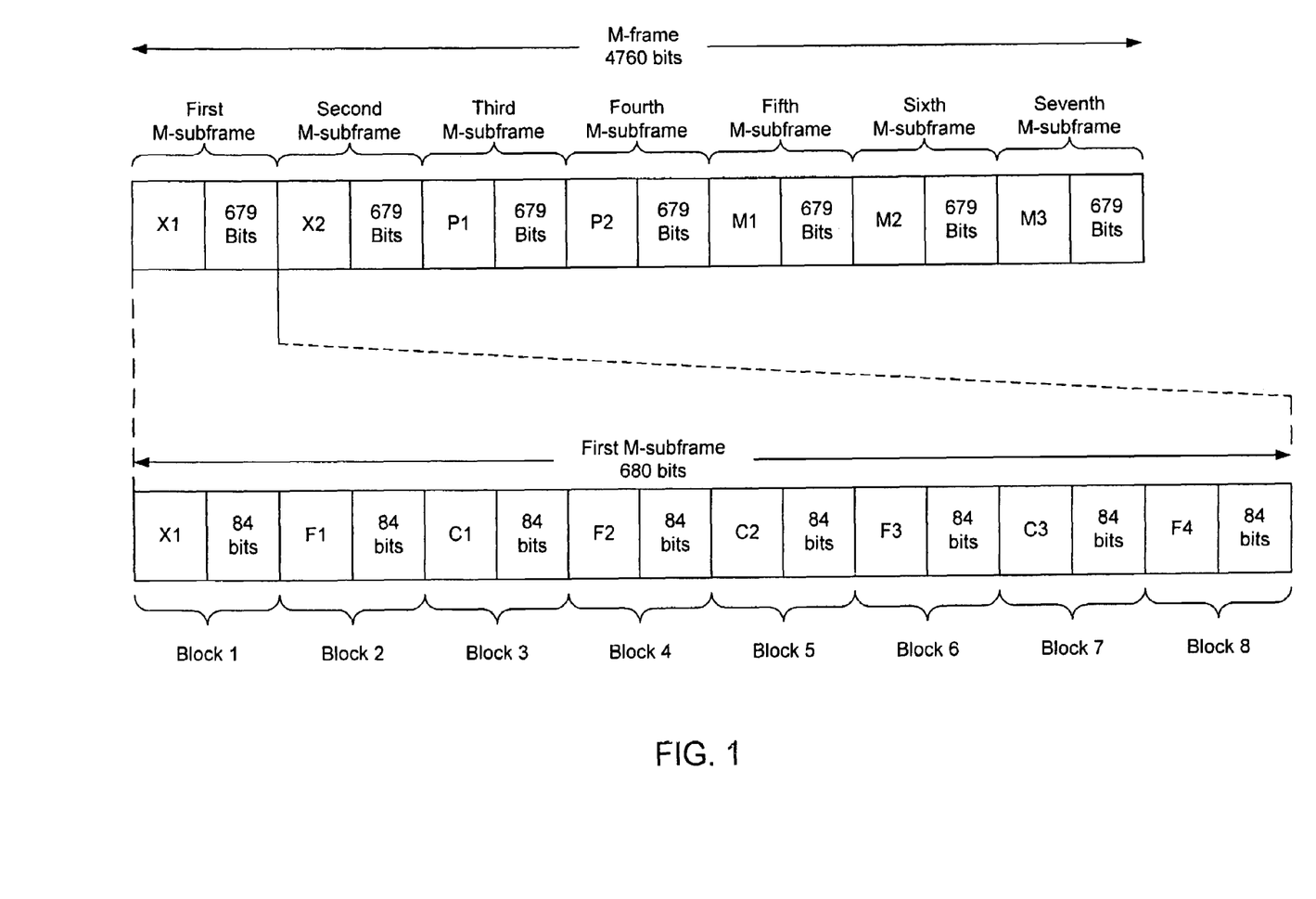
FIG. 1 is a diagram of the DS3 framing format as described in Standard T1.107-2001.

A DS3 signal is a framed signal having a nominal rate of 44.736 Mbits/s. The basic DS3 framing format is specified in specifications called T1.107 and T1.107a. FIG. 1 shows the DS3 frame format, which illustrates a single DS3 signal frame, which may include data being transmitted over a telecommunications network. A DS3 signal includes a sequence of one or more DS3 frames. A single DS3 frame is called an M-frame. As shown in FIG. 1, the DS3 signal is partitioned into M-frames of 4760 bits each. The M-frames are divided into seven M-subframes, each M-subframe having 680 bits. FIG. 1 also shows the format of a first M-subframe, which is representative of all seven M-subframes. Each M-subframe is further divided into 8 blocks of 85 bits each. The first bit of each 85 bit block is used for overhead, with the remaining 84 bits available for payload.

There are a total of 56 frame overhead bits in an M-frame (one overhead bit from each of eight blocks in a subframe, and seven subframes per M-frame). The overhead bits are assigned various functions. An M-frame alignment channel is formed by three bits (M1, M2, and M3, arranged as shown in FIG. 1). Twenty-eight bits (F1-F4 in each of seven subframes) form the M-subframe alignment channel. Two bits (P1 and P2) are designated for a parity (P) channel and two additional bits (X1 and X2) are designated for an alarm (X) channel. The remaining 21 overhead bit positions are C-bits that are reserved for application-specific uses by DS3 sources.

There are currently two applications using the basic DS3 format: Asynchronous (M23) multiplex and the C-bit parity application. According to the M23 multiplex application, four DS1 signals are multiplexed into one DS2 6.312 Mbits/s signals and then seven DS2 signals are multiplexed using dedicated bit-stuffing synchronization to generate the DS3 signal. A DS3 signal constructed in such a manner can be de-multiplexed into seven 6.312 Mbits/s channels. The M23 multiplex application uses the C-bits to indicate the presence or absence of stuffing bits.

According to the C-bit parity application, 28 DS1 signals are multiplexed to the DS3 signal level with an intermediate multiplexing step from DS1 to DS2. The DS2 signals are locked to the rate of DS3 and rate adjustments are made in multiplexing the DS1 signals into the DS2 signal. The C-bit parity application has nine C-bits (C1, C2, and C3 in M-subframes 2, 6, and 7) that are preserved for application specific uses in DS3 terminal equipment.

A DS3RM is a DS3 network element that is intended for installation on the service provider's side of a DS3 network interface (NI) along a DS3 path between the service provider (e.g., an LEC) and an end user or a customer (e.g., CPE). The DS3RM provides functions that allow the service provider to evaluate and characterize the transmission performance of the network in a non-intrusive manner and to sectionalize trouble at the network interface without dispatching personnel to the site. Thus, in one embodiment, a DS3RM may interface the network and the customer installation (CI) via a Digital Signal Cross Connect (DSX-3) panel. The Remote Module may pass DS3 signals in both directions: from the network toward the CI and from the CI toward the net-work. Moreover, the Remote Module is capable of handling DS3 signals using the 'bipolar with three-zero substitution' (B3ZS) line code and one of three framing formats: unchannelized, M23 multiplex, and C-bit parity. The B3ZS code is a line code in which bipolar violations are deliberately inserted if user data contains a string of three or more consecutive zeros. The code is used to ensure a sufficient number of transitions to maintain system synchronization when the user data stream contains an insufficient number of "ones" to do so. In exemplary embodiments described below, a remote module such as DS3RM is referred to as a network interface unit (NIU).

If no provision is made for transmitting AIS-CI signal, a standard network element (usually an NIU) receiving a failed signal from the CPE may replace the failed signal with a properly framed DS3 signal that is formatted so as to provide an AIS indication. According to standards such as the Standard T1.403-1999, this configuration is required of any network element along the DS3 path, including the NIU at the network interface. If DS3 AIS-CI is available, the NIU at the network interface may insert AIS with modifications that produce AIS-CI. The incoming signal indicates that the trouble is in the CPE if the signal is AIS-CI. Otherwise, if the signal is AIS, the trouble is in the network.

In one embodiment, DS1 signals are multiplexed into a DS3 signal in a two-step framing process. The first step involves forming a DS2 signal by combining four DS1 signals. In the second step, a DS3 signal is formed by multiplexing seven DS2 signals. Therefore, DS1 AIS signal cannot be used to indicate alarm condition in a DS3 NIU because DS1 AIS signal is unframed and DS3 AIS signal is frame, and thereby making the two signals incompatible.

Figure 2:
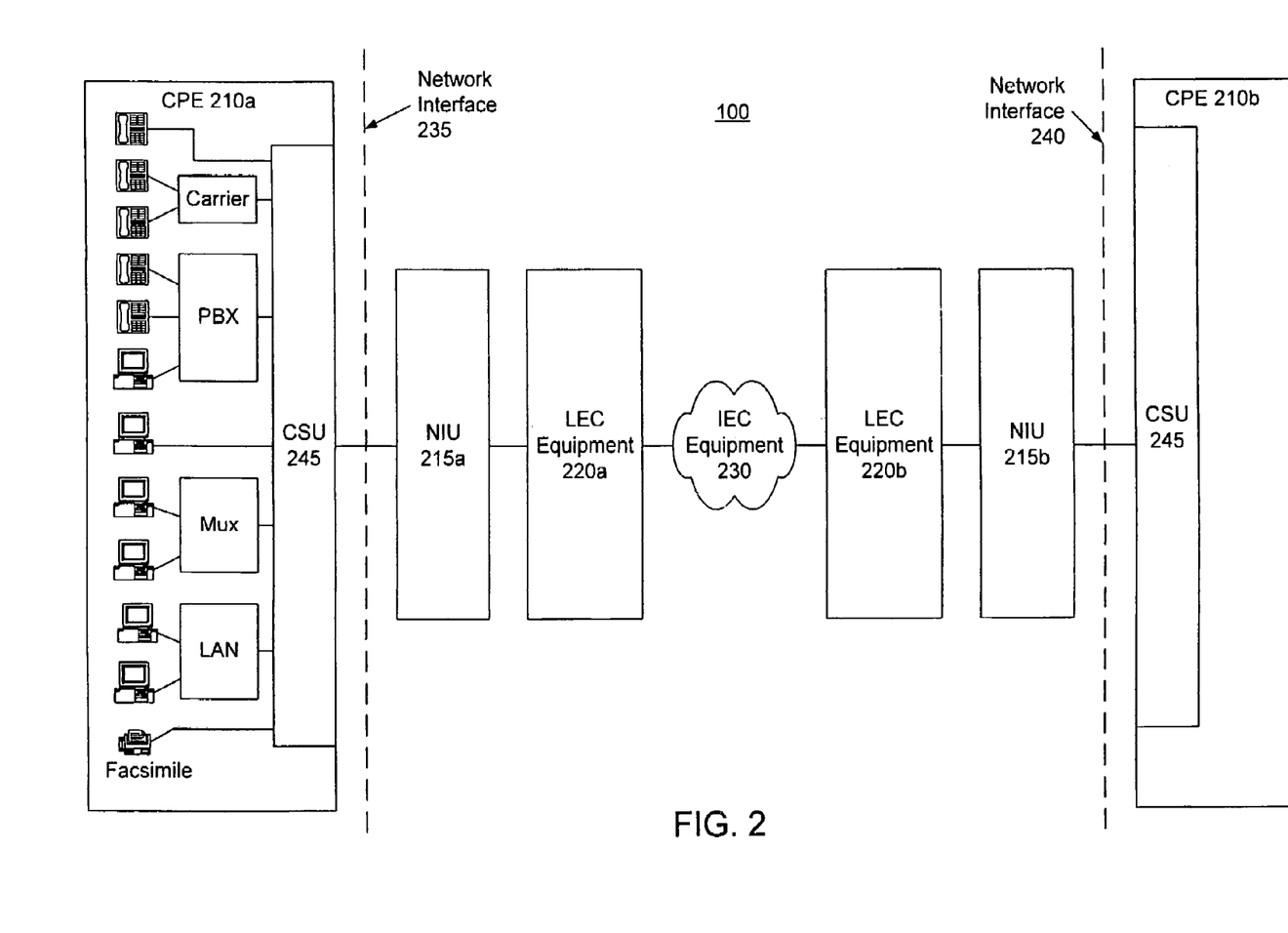
FIG. 2 a high level block diagram of a DS3 communication system.

FIG. 2 shows a high level block diagram of a DS3 communication system 100. The system 100 includes customer premises equipment (CPE) 210a, 210b, network interface units (NIUs) 215a, 215b, and local exchange carrier (LEC) equipment 220a, 220b. The system 100 further includes interexchange carrier (IEC) equipment 230 that communicatively links multiple LEC equipment 220 to one another. The NIUs 215a, 215b, the LEC equipment 220, and the IEC equipment 230 are collectively referred to as the "network." Thus, data can travel over the network from one user at the first CPE 210a to another user at the second CPE 210b.

A pair of dashed lines in FIG. 2 identify network interfaces 235, 240, which are the points of demarcation between the CPE 210a, 210b, respectively, and the network. The NIUs 215a and 215b are located at the network interfaces 235 and 240, respectively. The suffix "a" is used to designate a device at the left side of FIG. 2 and the suffix "b" is used to designate a device at the right side of FIG. 2. Furthermore, references to reference numeral 215 will be understood to apply equally to both NIUs 215a and 215b. Likewise, references to reference numeral 210 will be understood to apply equally to both CPE 210a and 210b. Each NIU 215 is dual ported with one side communicatively connected to a respective CPE 210 and the other side communicatively connected to the network via the LEC equipment 220. Thus, all communication signals passing to or from a CPE must travel through the respective NIU 215.

In one embodiment, a DS3 remote module, such as the NIU 215, may include several features such as a transmission path that accommodates M23 or C-bit parity signal, and may provide protection in the form of a DS3 bypass repeater. The remote module may also allow interface with the DS3 environment at a DSX-3 cross-connect panel using a proprietary "long loop" interface, and may provide electrical isolation at the network interface for safety purposes. Furthermore, the remote module may provide line loopback capability to ensure that the remote module does not respond to looping codes intended for the DS3 path termination. That is, the loopback capability allows looping of the DS3 NIU toward the network in response to codes intended to loop the NIU, but prevents the DS3 NIU from responding to loopback codes intended for the CSU or other CPE. The performance monitoring information may be collected and transmitted from the remote module using several different formats. For M23 format, the C-bit pattern can be modified to provide forward error correction (FEC) rather than using majority voting error correction. The remaining bandwidth can then be used to transmit the performance monitoring information.

The IEC equipment 230 comprises communication network equipment that is configured to transmit communication signals between the local exchange carrier equipment 220a and 220b. The IEC equipment 230 may use a wide variety of transmission technologies to transport communication signals, including satellite systems, microwave systems, coaxial systems, fiber optic systems, etc.

The CPE 210 includes any communication equipment that is owned and maintained by a customer of a communication service provider. The CPE 210 may include any of a wide variety of communication equipment, including, for example, standard telephone sets, telephone sets coupled to a carrier system, a private branch exchange (PBX) that provides voice and/or data communication signals, a facsimile machine, a computer (coupled to a modem), a plurality of computers coupled to a multiplexer and modem, a local area network (LAN), and any other communication equipment. For clarity of illustration, only the left-side CPE 210a in FIG. 2 includes detail illustrations of the various communication equipment, although it will be understood that both CPE on the left 210a and on the right 210b contain some type of communication equipment that is owned and maintained by the customer. It is the customer's responsibility to ensure that the CPE provides an error-free communication signal to the LEC equipment 220.

The CPE 210a, 210b at both ends of the communication channel each include a channel service unit (CSU) 245; which performs diagnostic functions for the telecommunication lines in the CPE portion of the lines. The CSU 245 checks to ensure that communication signals of the respective CPE conform to performance standards that are set by the communications industry. The CSU 245 also detects various errors in communication signals and inserts alarm indications where appropriate, such as the RAI and AIS alarm signals that were discussed above. The CSUs 245 operate according to methods that are well-known to those of skill in the art.

The LEC equipment 220 connects the CPE 210 to the IEC equipment 230. The LEC equipment 220 includes at least one central office (not shown in FIG. 2), which receives telecommunication signals from a respective CPE 210 and provides switching functions for proper routing of the signals. The signals may be routed to other central offices that can be linked to additional CPE. The LEC equipment 220 also includes a local loop that couples the CPE 210 to a respective central office. An LEC generally has responsibility for maintaining the LEC equipment 220. It should be appreciated that the multiple CPE may be communicatively linked to LEC equipment.

The CPE 210, LEC equipment 220, and IEC equipment 230 collectively form a communication data path through which communication signals, such as DS3 signals, may be transported. An exemplary communication signal can originate at the CPE 210a at one end and have the CPE 210b at the other end as a destination. In such a case, the CPE 210a is the source of the signal and the CPE 210b is the sink.

A signal that originates at the CPE 210a travels along the data path through the NIU 215a and to the LEC equipment 220a. The LEC equipment 220a routes the signal to additional LEC equipment if appropriate or routes the signal to the IEC equipment 230. The IEC equipment 230 then routes the signal to the appropriate LEC equipment, which in this case is the LEC equipment 220b. The signal is then routed to the NIU 215b for delivery to the CPE 210b. It is appreciated that a communication signal may also originate at the CPE 210b on the right side of FIG. 2 and travel in an opposite direction toward the left-side CPE 210a.

Network Interface Unit

Figure 3:
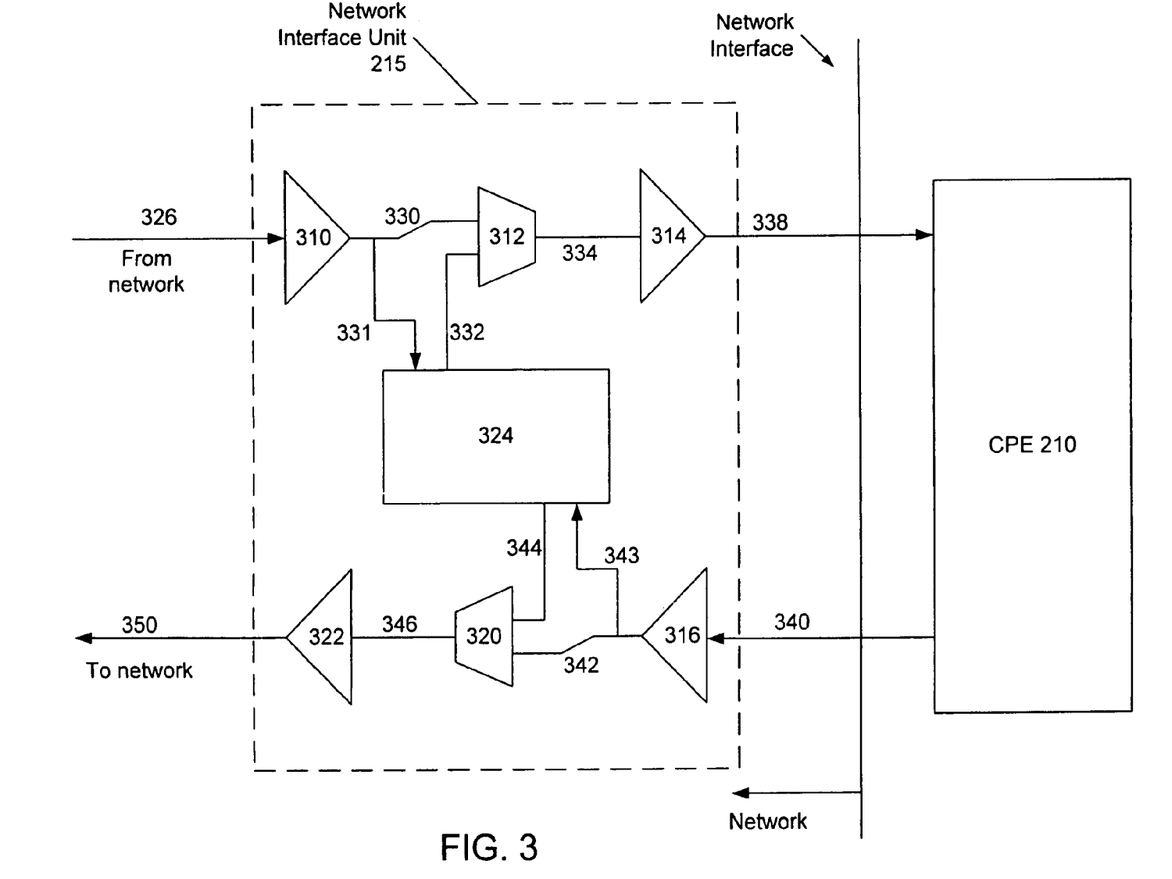
FIG. 3 is a schematic diagram of an exemplary network interface unit of the communication system of FIG. 2.

FIG. 3 is a schematic diagram of an exemplary network interface unit (NIU) 215 that is located at a network interface and communicatively coupled between the network and a CPE 210. The NIU 215 includes a first receiver 310 that receives DS3 signals from a communication network, a first multiplexer 312, and a first transmitter 314 that outputs DS3 signals to the CPE 210, thereby defining a first data path. The NIU 215 further includes a second receiver 316 that receives DS3 signals from the CPE 210, a second multiplexer 320, and a second transmitter 322 that transmits signals to the network, thereby defining a second data path. The NIU 215 further includes a microprocessor 324 that is configured to receive and analyze signals from the network and from the CPE 210.

The first receiver 310 receives input on a data line 326 that comes from the network. The NIU 215 can receive communication signals from the network over the data line 326. A data line 330 connects an output of the first receiver 310 to an input of the multiplexer 312. The data line 330 also branches into a leg 331 that connects to the microprocessor 324 so that the output of the first receiver 310 can also be input to the microprocessor 324. A data line 332 connects the microprocessor 324 to the first multiplexer and can be used to route signals from the microprocessor 324 to the multiplexer 312.

A data line 334 connects the output of the multiplexer 312 to the input of the first transmitter 314 so that the multiplexer can output communication signals to the first transmitter 314. A data line 338 connects the first transmitter 314 to the CPE 210. In this manner, the NIU 215 can transmit DS3 communication signals to the associated CPE 210.

A data line 340 connects the CPE 210 to the second receiver 316 to thereby enable the second receiver to receive DS3 communication signals from the CPE 210. A data line 342 connects the output of the second receiver 316 to the second multiplexer 320. The data line 324 also has a leg 343 that connects to an input of the microprocessor 324. The microprocessor 324 can output signals to the multiplexer 320 via a data line 344. A data line 346 connects the output of the multiplexer 320 to the second transmitter 322. A data line 350 connects the output of the second transmitter 322 to the network. In this manner, the NIU 215 can transmit communication signals from the associated CPE 210 to the network via the data line 350.

The NIU 215 may be equipped with a local power source or it may be powered by passing a DC line current over the cables that carry the DS3 signals to the NIU 215.

As mentioned, the NIU 215 generates signals that provide information to a signal-receiving device regarding the location of error conditions and failures. This may be accomplished by converting a received DS3 data signal into a unique signature DS3 signal that has a configuration that can be detected by a downstream device. The downstream device may include any of a variety of communication devices, including another NIU or a test and monitoring device, such as described in U.S. Pat. No. 5,495,470 entitled "Alarm Correlation System for a Telephone Network" and U.S. Pat. No. 5,500,853 entitled "Relative Synchronization System for a Telephone Network," both of which are assigned to the assignee of the present invention and are incorporated herein by reference.

There are two types of indicators that sectionalize trouble at the network boundary. One type, exemplified by the Supplementary Performance Report Messages (SPRM), uses a portion of the normal bandwidth of the signal to convey information about errors that are not of such frequency or severity so as to fail the communication path. The other type, of which DS1 AIS-CI and DS1 RAI-CI are examples, is operative when the path is errored to the point that the path is substantially useless for communication and the path is considered to have "failed."

DS3 AIS-CI Signal

The NIU 215 can detect when a DS3 AIS alarm signal is received in a data line from the CPE 210. The NIU can also detect a signal failure, such as Loss of signal (LOS) or Loss of Frame (LOF), in the data line from the CPE 210. In response to detecting an AIS, LOS, or LOF in the data line from the CPE 210, the NIU generates a unique signature AIS signal to indicate that an error condition or a failure that triggered the AIS, LOS, or LOF in the data line is located in the associated CPE. The unique signature AIS signal is referred to herein as a DS3 AIS-CI signal. The process of generating a DS3 AIS-CI signal is described with respect to the flow diagram shown in FIG. 4.

Figure 4:
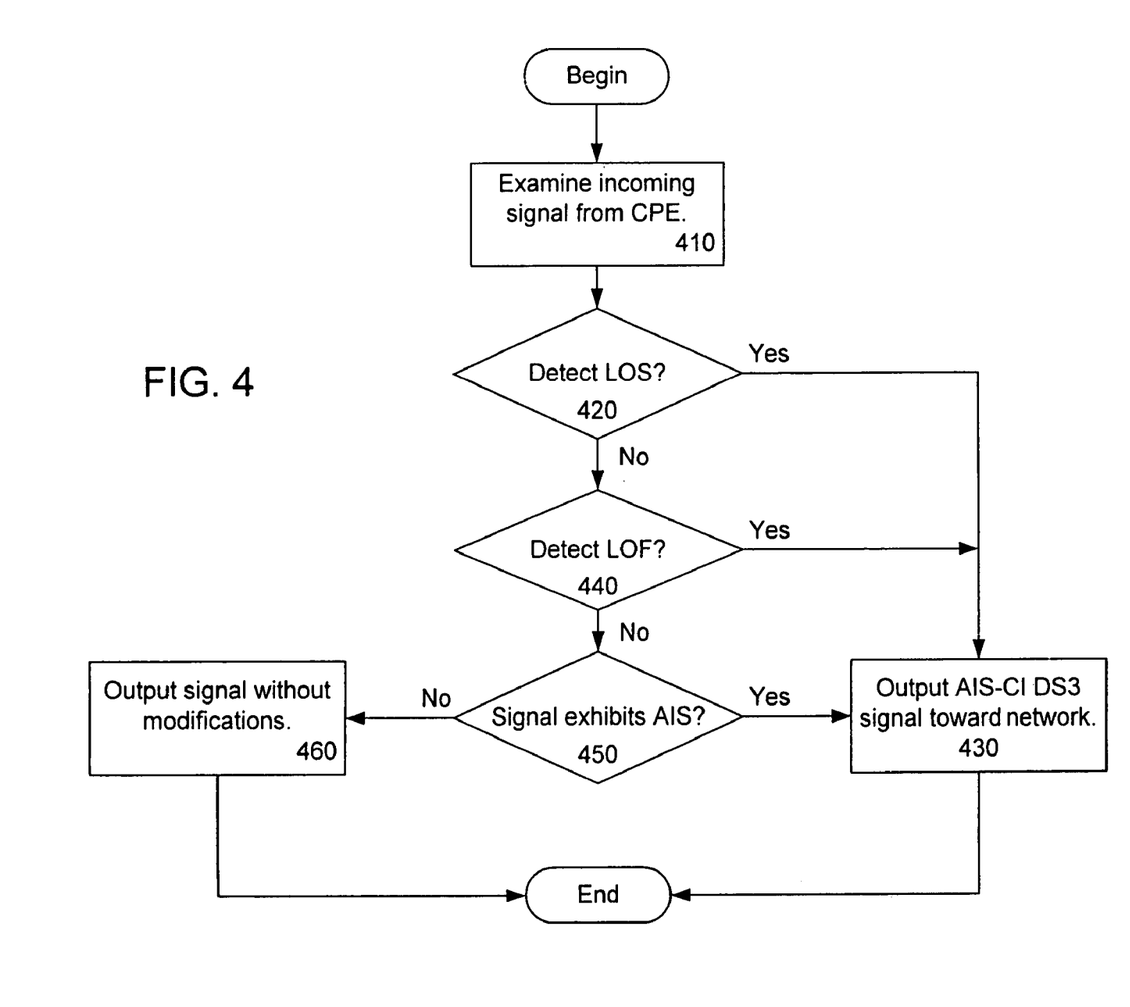
FIG. 4 is a flow diagram that describes the operations performed in generating an DS3 AIS-CI signal.

With reference to FIG. 4, the process begins when the NIU 215 receives a DS3 signal in the data line from the CPE 210. The NIU 215 examines the signal from the CPE 210, at 410. The NIU 215 may examine the CPE signal using the microprocessor 324. Thus, the NIU 215 may route the CPE signal from the second receiver 316 (shown in FIG. 3) to the microprocessor 324 via the data line 343.

The microprocessor 324 then determines whether a DS3 Loss of Signal (LOS) failure indication is detected in the data line from the customer premises, at 420. According to the Standard T1.231, a DS3 LOS failure is declared when a DS3 LOS defect persists for 2.5 sections ±0.5 seconds. An LOS defect occurs when 175±75 contiguous pulse positions with no pulses of either positive or negative polarity at a DS3 line interface are detected.

Figure 5:
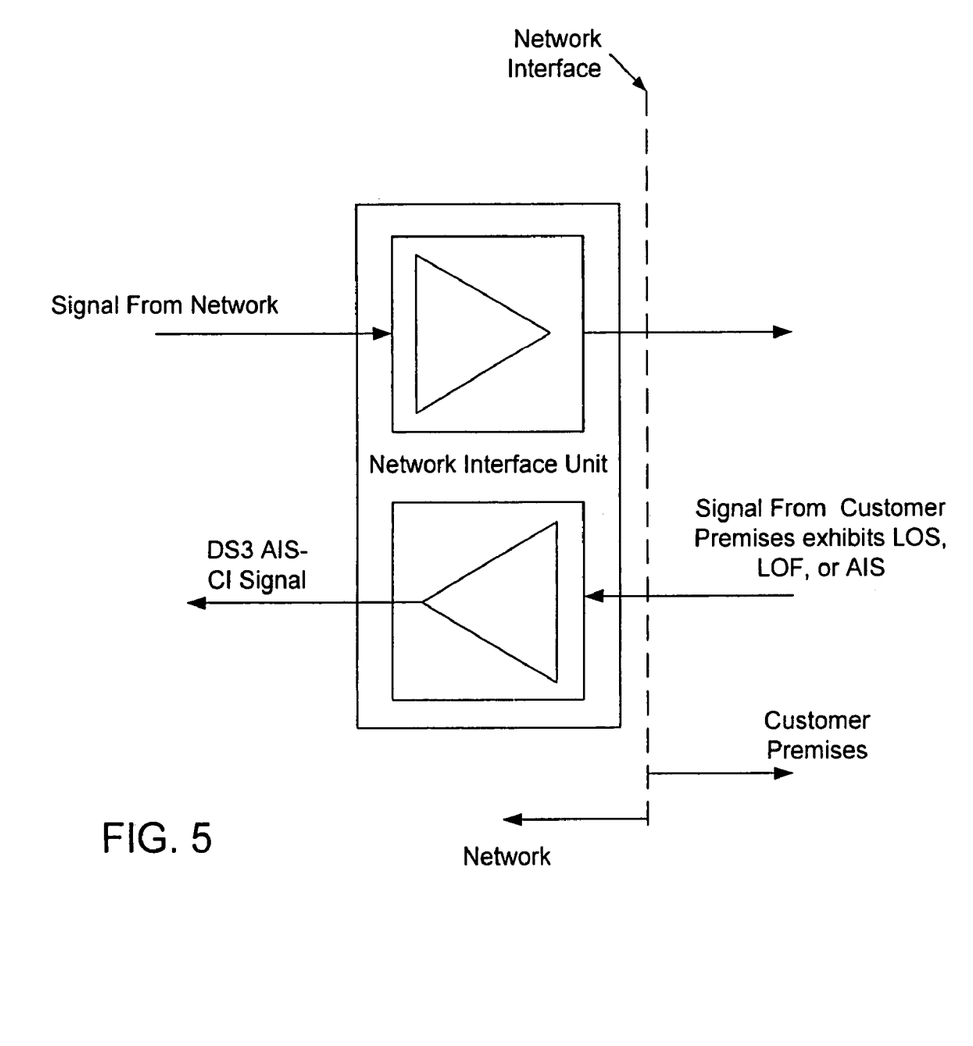
FIG. 5 is a diagram of a network interface unit showing the conditions that would lead to generation of a DS3 AIS-CI signal by the network interface unit.

If the microprocessor 324 detects an LOS failure in the data line, at 420, then the NIU 215 outputs a DS3 AIS-CI signal toward the network via the transmitter 322 (shown in FIG. 3), at 430. The situation that triggers the outputting of a DS3 AIS-CI signal is illustrated in FIG. 5, which shows an NIU that detects an LOS failure in the data line from the CPE. The NIU 215 resultantly outputs a DS3 AIS-CI signal toward the network.

The DS3 AIS-CI signal that is output by the NIU 215 is transparent to devices that are not configured to detect the DS3 AIS-CI signal because the signal has the requisite fields of data so that NIUs that are not specifically configured will interpret the DS3 AIS-CI signal to be an AIS DS3 signal. However, an upstream device that is configured to detect the DS3 AIS-CI signal will recognize the signal as the DS3 AIS-CI signal. According to the Standard T1.107, a standard AIS DS3 signal is a signal with a valid M-frame alignment channel, M-subframe alignment channel, and valid P-bits. The information bits are set to a 1010 . . . sequence, starting with a one after each M-frame alignment bit, M-subframe alignment bit, P-bit, and C-bit channel. The C-bits are set to zero and the X-bits are set to one.

A received conventional AIS DS3 signal is converted into a DS3 AIS-CI signal by configuring one or more bits in the existing DS3 M-frame at a low enough rate such that equipment that is not configured to detect a DS3 AIS-CI signal interprets the data pattern as a conventional AIS DS3 signal. The microprocessor 324 can achieve this goal by inserting the data pattern of the overhead bits such that the insertion is equivalent to insertion of errors into the DS3 signal at a bit error ratio (BER) of not greater than $10^{-3}$. However, a typical value used for the BER is approximately $4 \times 10^{-4}$. The BER is expressed as a ratio of errored bits per unit time to total bits per unit time.

In one exemplary embodiment, the microprocessor 324 modulates the bit C3 of M-subframe 7 of the DS3 M-frame with a repeating 001011 . . . pattern. This replaces the all-zero pattern that the C3 bit of M-subframe 7 normally carries in an AIS DS3 signal. Such a pattern produces an equivalent BER of approximately $10^{-4}$. In an alternative embodiment, any one of the control bits may be modified. However, per the standard, M-bits or F-bits should not be changed since these bits record performance monitoring errors in the framing scheme.

Consequently, a DS3 receiver in a signal-receiving device designed to detect a DS3 AIS-CI signal can distinguish a standard AIS DS3 signal from a DS3 AIS-CI signal by observing the inserted bit pattern as discussed above. A DS3 receiver not equipped to detect a DS3 AIS-CI signal interprets the DS3 AIS-CI signal as a standard AIS DS3 signal with a bit error ratio (BER) of approximately $10^{-4}$.

It should also be appreciated that the NIU 215 can generate the DS3 AIS-CI signal, rather than modifying an existing AIS DS3 signal received from the CPE 210. After generating the DS3 AIS-CI signal, the microprocessor 324 outputs the DS3 AIS-CI signal through the data line 342 to the multiplexer 320, which then outputs the AIS-CI signal to the transmitter 322 for outputting to the network via the data path 350.

With reference again to FIG. 4, if the microprocessor 324 does not detect, at 420, an LOS failure in the data line from the CPE 210, then the microprocessor 324 determines, at 440, whether a DS3 Loss of Frame (LOF) failure is detected in the data line from the CPE 210. According to the Standard T1.231, a DS3 LOF exists when a DS3 Out of Frame (OOF) defect persists for 2.5 seconds ±0.5 seconds. A DS3 OOF defect occurs when a particular density of F-bit, and sometimes M-bit errors in the DS3 signal format are detected.

If the microprocessor 324 detects, at 440, a DS3 LOF failure condition in the data line from the CPE 210, then the NIU 215 transmits a DS3 AIS-CI signal toward the network, at 430. If the microprocessor 324 does not detect an LOF condition in the data line from the CPE 210, the microprocessor 324 then determines whether the CPE signal exhibits a DS3 AIS indication, at 450. Otherwise, if the microprocessor 324 determines, at 450, that the CPE signal exhibits a DS3 AIS indication, then the NIU 215 transmits a DS3 AIS-CI signal toward the network, at 430. This may be accomplished by modifying the existing AIS DS3 signal as discussed above.

If the microprocessor 324 determines, at 450, that the CPE signal does not exhibit DS3 AIS, which indicates that neither LOS, LOF, or AIS are detected on the data line from the CPE 210, then the NIU 215 detected no failure on the data line from the CPE 210. In this case, the NIU 215 outputs the received CPE signal to the network through the data path 350 without making any modification to the CPE signal.

The process described above in conjunction with FIG. 4 results in the NIU 215 generating a DS3 AIS-CI signal when it detects a failure in the data line from the CPE 210, such as when DS3 LOS or LOF is detected, or when a DS3 AIS signal is received from the CPE 210.

DS3 RAI-CI Signal

Figure 7:
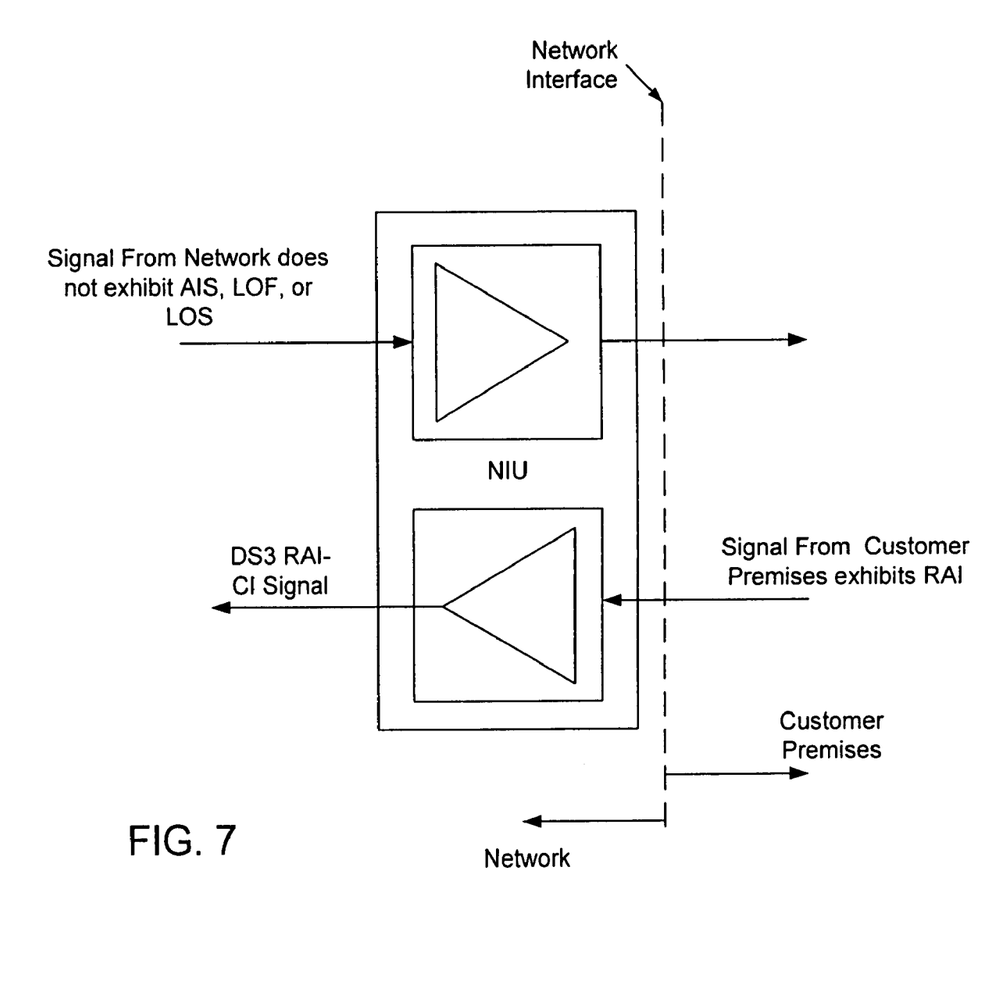
FIG. 7 is a diagram of a network interface unit showing the conditions that would lead to generation of a DS3 RAI-CI signal by the network interface unit.

The NIU 215 generates a unique signature Remote Alarm Indicator (RAI) DS3 signal to indicate to specially-configured downstream (i.e., relative to the flow of data) devices that an error condition or a failure is present at the CPE 210. The unique signature RAI signal is referred to herein as a DS3 RAI-CI signal. FIG. 7 illustrates an NIU operation in accordance with an exemplary embodiment. In this embodiment, the NIU 215 outputs a DS3 RAI-CI signal toward the network. Hence, if the NIU 215 receives a DS3 signal from the network that does not indicate any failure (i.e., the signal from the network does not exhibit AIS, LOF, or LOS), but receives a resultant signal from the CPE that exhibits remote alarm condition, the NIU 215 outputs a DS3 RAI-CI signal toward the network. This would be an indication that the condition that caused the RAI signal originated somewhere in the customer premises and not in the network.

Figure 6:
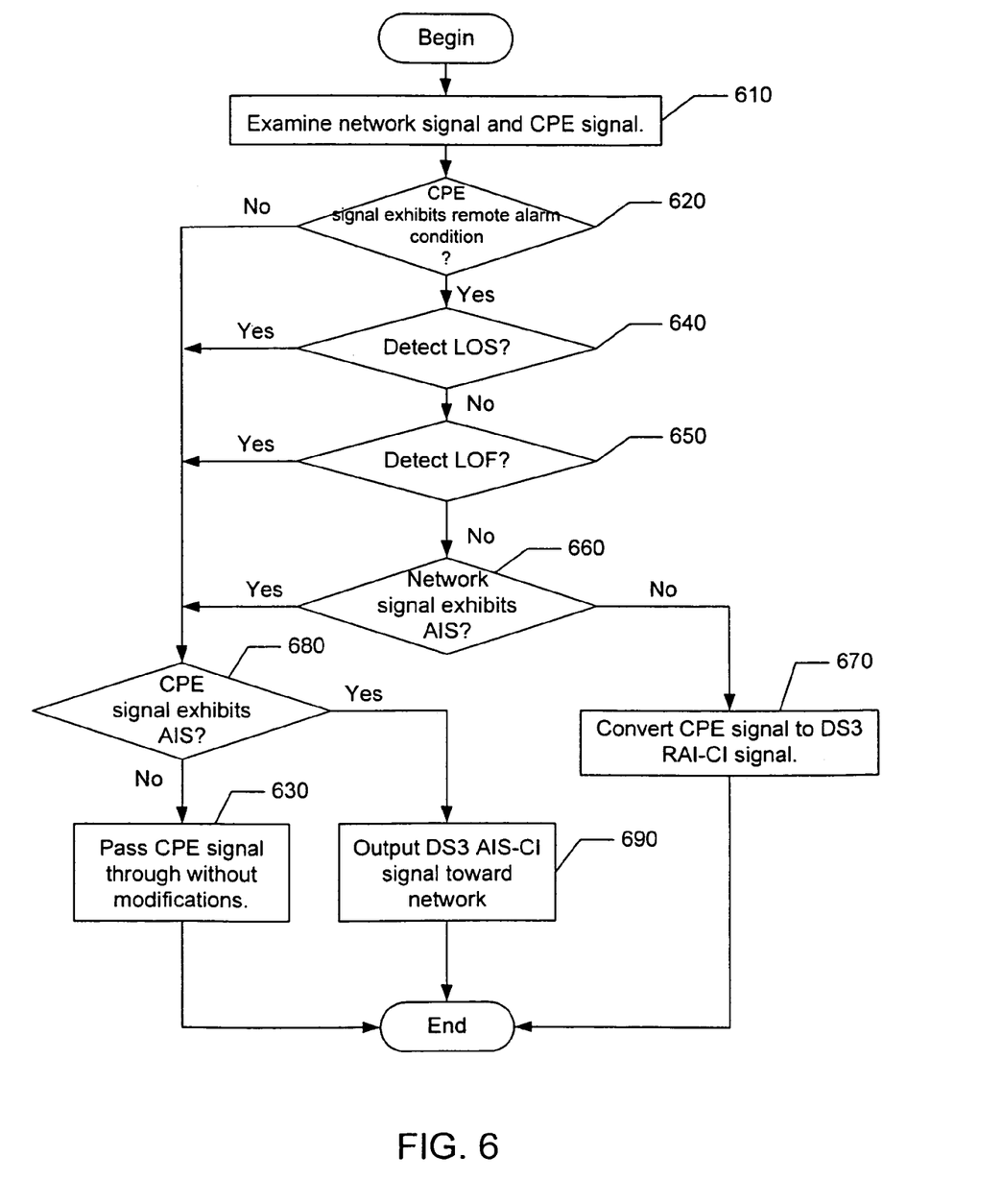
FIG. 6 is a flow diagram that describes the operations performed in generating a DS3 RAI-CI signal.

FIG. 6 is a flow diagram that describes the process of generating a DS3 RAI-CI signal according to an exemplary embodiment. The NIU 215 examines, at 610, both a signal received from the network (the "network signal") and the resultant acknowledgement signal from the CPE 210 (the "CPE signal"). The first receiver 310 (shown in FIG. 3), which receives the network signal, routes the network signal to the microprocessor 324 for review via the data line 331. Likewise, the second receiver 316, which receives the CPE signal, routes its signal to the microprocessor 324 via the data line 343. The microprocessor 324 then determines, at 620, whether the CPE signal is exhibiting a remote alarm condition. According to the Standard T1.107, a signal (i.e., DS3 RAI signal) that exhibits remote alarm condition has the X-bits of the M-frame set to zero, which occurs upon receipt of a severely errored frame or an AIS defect. The Standard T1.107 further states that a DS3 source shall not change the state of the X-bits more than once every second.

If the CPE signal is not exhibiting remote alarm condition, at 620, then the NIU 215 has not detected any failure on the DS3 line from the CPE 210 and so there is no need to modify the CPE signal. However, if the CPE signal exhibits AIS, as indicated at 680, then the NIU 215 outputs a DS3 AIS-CI signal toward the network, at 690. Otherwise, at 630, the NIU 215 passes the CPE signal toward the network without making any modifications to the CPE signal through the data line 350 (shown in FIG. 3).

If the CPE signal is indicating a remote alarm condition, at 620, the NIU 215 then determines whether the network signal exhibits any failures. Accordingly, the NIU 215 determines, at 640, whether a DS3 LOS failure is detected on the data line from the network. The determination may be performed by the microprocessor 324 (shown in FIG. 3). If the NIU 215 detects a DS3 LOS failure on the data line from the network, then the error condition/failure that caused the CPE 210 to output the RAI signal is present in the network and not in the CPE 210. Thus, there is no need to convert the CPE signal to a DS3 RAI-CI signal, and the NIU 215 simply passes the CPE signal through toward the network without making any modifications to the CPE signal, at 630, if the CPE signal does not indicate AIS, at 680.

If the NIU 215 detects no DS3 LOS failure on the data line from the network, at 640, the NIU 215 then determines, at 650, whether a DS3 LOF failure is detected on the data line from the network. If the NIU 215 detects a DS3 LOF failure on the data line from the network, then the NIU 215 passes the CPE signal through toward the network without making any modifications to the CPE signal, at 630, if the CPE signal does not indicate AIS, at 680. However, if the NIU 215 detects, at 650, no DS3 LOF failure on the data line from the network, then the NIU 215 determines, at 660, whether the network signal is exhibiting a DS3 AIS indication. As discussed above, an AIS DS3 signal is a signal with a valid M-frame alignment channel, M-subframe alignment channel, and valid P-bits. The information bits are set to a 1010 . . . sequence, starting with a one after each M-frame alignment bit, M-subframe alignment bit, P-bit, and C-bit channel. The C-bits are set to zero and the X-bits are set to one.

If the network signal is exhibiting a DS3 AIS indication at 660, then the NIU 215, at 630, passes the CPE signal through toward the network without making any modifications to the CPE signal, if the CPE signal does not indicate AIS, at 680. However, if it is determined that the network signal is not exhibiting a DS3 AIS indication, then the situation exists where the network signal is not exhibiting any failure but the CPE signal is exhibiting an RAI condition, such as the situation shown in FIG. 7. In this case, the error condition/failure that caused the CPE 210 to generate the RAI signal exists in the CPE 210 and not in the network. Thus, the NIU 215 converts the CPE signal to a DS3 RAI-CI signal for output to the network, at 670.

The NIU 215 converts a DS3 signal into a DS3 RAI-CI signal by changing the states of the X-bits in the DS3 M-frame from logical zero to logical one for one M-frame every ten M-frames. The upstream NIU or other device that is designed to recognize the DS3 RAI-CI signature can then detect the DS3 RAI-CI signal, which indicates that an error condition or a failure is present in the customer premises. However, an upstream device that is not configured to recognize the DS3 RAI-CI signal may still recognize the DS3 RAI-CI signal as an unmodified DS3 signal that exhibits DS3 RAI in a conventional manner.

DS3 Maintenance Channel

A remote module (e.g. the NIU 215) may also be configured to collect and transmit the performance monitoring information back to the service provider. In one embodiment, this transmission of the performance monitoring information is accomplished by formatting a maintenance channel on an existing DS3 signal using an error detection or error correction scheme. A distant remote module or an intervening T3 automatic sectionalizer (T3AS) may strip out the added information and restore the original information prior to handing the DS3 signal off to a distant customer or other network provider.

The configuration of the maintenance channel can be varied according to the framing format of the DS3 signal. For example, if the DS3 signal is C-bit parity formatted, the remote module may use the extra C-bit capacity in the C-bit parity format to configure a maintenance channel. However, if the DS3 signal is M23 multiplex-formatted, the C-bit channel may be reformatted into three substreams. The first substream may carry the original C-bit information; the second substream may carry a maintenance channel for conveying the performance information to the network; and the third substream may provide error detection and/or correction using a well-known error detection and/or correction method, such as Bose-Chaudhuri-Hocquenghem (BCH) codes or Cyclic Redundancy Codes (CRC). Alternatively, the remote module may convert an M23 multiplex signal to C-bit parity format and then use the capacity of the C-bit parity overhead to configure the maintenance channel as described above for C-bit parity formatted signal. If the DS3 signal is unchannelized, the above-described methods may be applied in situations that do not affect customer data. Finally, if the DS3 signal is unframed, the remote module passes the signal and provides DS3 AIS as a keep alive signal, but does not provide performance monitoring.

As described above, additional bandwidth from a DS3 signal may be obtained using the M23 format for the transmission of performance monitoring information, maintenance commands and responses, and other related data. The three C bits per DS2 signal in the M23 format normally provide redundancy in the transmission of stuffing status. Any errors in the transmission of the C bits that are not removed by the redundancy results in the loss of DS2 synchronization and leads to failure of the four DS1 streams associated with the DS2 signal. The parity bits of the M23 format may not provide substantially accurate error checking and, further, fails to check overhead bits. Accordingly, the methods described below reformat the C-bit channel to obtain additional bandwidth and to increase the reliability of the C-bit information.

In one exemplary embodiment, one-half of the C-bit channel capacity is used to provide a BCH error correcting code, while two thirds of the remaining C-bit channel capacity is used to carry the stuffing control information. In this embodiment, the BCH code replaces the majority voting error correction scheme. Since the C-bit stream includes 21 C bits per multiframe, and taken serially, these bits provide the channel with a capacity of about 197 kilobits per second (kbps), the remaining capacity leaves about 32 kbps available for the transmission of other data. This remaining channel capacity is used as a maintenance channel to transmit performance monitoring data, commands, and alarm indications. Furthermore, including the C bits in the "payload" replaces the usual redundancy with the more reliable BCH code to protect the stuffing control information, as well as other device specific information.

If the BCH code is applied only to the stuffing control bit stream, the capacity of the derived data channel is about 66 kbps. Thus, 66 kpbs derived data link (DDL), which is more than adequate for carrying performance monitoring data, may be used to transmit information passed between the remote module (e.g. DS3RM) and the automatic sectionalizer (e.g. T3AS). Further, the transmission over DDL may use High-level Data Link Control (HDLC) frame with CRC error checking. Accordingly, in an alternative exemplary embodiment, the 21 C bits in a multiframe are assigned as shown in Table 1 below.

TABLE 1

Assignment of the C bits in a multiframe

| M-subframes | C1 | C2 | C3 |
|---|---|---|---|
| 1 | Stuffing control | BCH | DDL |
| 2 | Stuffing control | BCH | DDL |
| 3 | Stuffing control | BCH | DDL |
| 4 | Stuffing control | BCH | DDL |
| 5 | Stuffing control | BCH | DDL |
| 6 | Stuffing control | BCH | DDL |
| 7 | Stuffing control | BCH | DDL |

At the receiving end, the C2 stream is used to correct the error on the C1 stream prior to handing off the M23 multiplex signal to the customer at each end. The C1 stream is duplicated in C2 and C3 to overwrite the added information and to restore the majority voting scheme.

In the above-described configuration of a maintenance channel, the bandwidth is required to be sufficient to carry performance monitoring data for the DS3 signal and all the embedded DS1s back to the network provider. Furthermore, the DS1 performance report messages (PRM) are required to be transmitted at least at the rate of one per DS1 per second. Each DS1 PRM thus requires at least 120 bits including opening and closing flags, while each DS3 PRM requires at least 664 bits. Therefore, the total bandwidth required for transmitting PRMs in both directions of transmission from the network interface is approximately 2*((28*120)+664)=8048 bits per second. In contrast, if the conversion at the DS3 network interface (NI) is from M23 to C-bit parity rather than the modification of the M23 C-bit channel, the 28.2 kbps data link provided by the C-bit parity format also carries all the PRMs with the remaining bandwidth.

Replacement of the majority voting error correction in the M23 format stuffing control bits by the BCH code provides significant improvement of the bit error ratio (BER). For example, BCH code is capable of correcting randomly distributed bit errors by improving the BER from $10^{-3}$ to $10^{-8}$. The probability that two of the three C-bits will be erred to defeat the majority voting scheme in the M23 format with the BER of $10^{-3}$ is $(10^{-3})^2=10^{-6}$. The BCH code therefore requires less bandwidth and provides improved performance over the usual majority voting scheme.

For randomly-distributed stuffing error, calculation of the error probabilities associated with the use of the BCH code indicates an improvement of the bit error ratio (BER) from $10^{-3}$ to $10^{-8}$ and a stuffing error to approximately $2.998 \times 10^{-6}$. For example, the probability of a stuffing error is given by:

$$p(e) = \frac{n!}{k!*(n-k)!} * p^k * (1-p)^{n-k}$$

where p=probability of error (uncorrected)=$10^{-3}$
n=the number of possible combinations of three C bits taken two $$\text{at a time} = \frac{3!}{2!*(3-2)!} = 3$$

k=number of bits required to be erred to cause stuffing error=2 Hence, the stuffing error p(e)=$2.997 \times 10^{-6}$. To corroborate the result, the three stuffing control bits can be considered as a sequence of binary numbers where zero equals an error and one equals a correct control bit. Table 2 illustrates the stuffing bit error for each C-bit pattern.

TABLE 2

Stuffing Bit Error for Each C-bit Pattern

| C1 | C2 | C3 | Probability of the pattern | Stuffing control bit error ? |
|---|---|---|---|---|
| 0 | 0 | 0 | $10^{-9}$ | Yes |
| 0 | 0 | 1 | $9.99 \times 10^{-7}$ | Yes |
| 0 | 1 | 0 | $9.99 \times 10^{-7}$ | Yes |
| 0 | 1 | 1 | $9.98 \times 10^{-4}$ | No |
| 1 | 0 | 0 | $9.99 \times 10^{-7}$ | Yes |
| 1 | 0 | 1 | $9.98 \times 10^{-4}$ | No |
| 1 | 1 | 0 | $9.98 \times 10^{-4}$ | No |
| 1 | 1 | 1 | $9.97 \times 10^{-1}$ | No |

The sum of the four probabilities associated with a stuffing control bit error is $10^{-9}+3*(9.99 \times 10^{-7})=2.998 \times 10^{-6}$. This result agrees with the computed result (i.e. $2.997 \times 10^{-6}$) within the precision used.

While specific embodiments of the invention have been illustrated and described, such descriptions have been for purposes of illustration only and not by way of limitation. The present invention should therefore not be seen as limited to the particular embodiment described herein, but rather, it should be understood that the present invention has wide applicability with respect to telecommunication systems generally. Throughout this detailed description, for the purposes of explanation, numerous specific details were set forth in order to provide a thorough understanding of the present invention. It will be apparent, however, to one skilled in the art that the embodiments may be practiced without some of these specific details. In other instances, well-known structures and functions were not described in elaborate detail in order to avoid obscuring the subject matter of the present invention. For example, although the details for implementing the BCH code are not provided herein, the code may be implemented as a (17, 9) BCH code which is shortened to (16, 8) to allow each eight-bit parity byte to error correct a single eight-bit data byte. Using the assignment scheme shown in Table 1, the code can be further shortened to maintain a synchronous relationship between the code elements and multi-frames. Alternatively the eight-bit DDS code, or even an unshortened (17, 9) code can be used to correct the seven-bit sequences of control bits with the code element boundaries and multiframe boundaries "slipping" in time relative to each other. In another example, although the details of the options in the remote module implementations are not disclosed herein, it is understood that various options within the remote module may be set locally using switches or may be set from within the service provider's network by transmitting properly coded messages to the module via bits in the DS3 overhead stream which do not interfere with customer transmission. Accordingly, all modifications, variations, or equivalent arrangements and implementations that are within the scope of the attached claims should therefore be considered within the scope of the invention.

What is claimed is:

1. A method, comprising:
    reformatting a DS3-formatted signal by dividing the DS3-formatted signal into at least first, second, and third portions;
    allotting the first portion to provide an error correcting code;
    allotting the second portion to provide for stuffing control information; and
    allotting the third portion for transmission of performance monitoring and maintenance information.

2. The method of claim 1, wherein the first portion is used to correct any errors in the second portion.

3. The method of claim 1, wherein the error correcting code includes a Bose-Chaudhuri-Hocquenghem (BCH) error correcting code.

4. The method of claim 1, further comprising:
    receiving the DS3-formatted signal; and
    decoding the third portion of the DS3-formatted signal to extract stuffing control information and performance monitoring and maintenance information.

5. The method of claim 4, further comprising:
    using the first portion to correct any errors in the second portion.

6. The method of claim 4, further comprising:
    duplicating the second portion in the first and the third portion to overwrite added information.

* * * * *